United States Patent Office 3,466,841
Patented Sept. 16, 1969

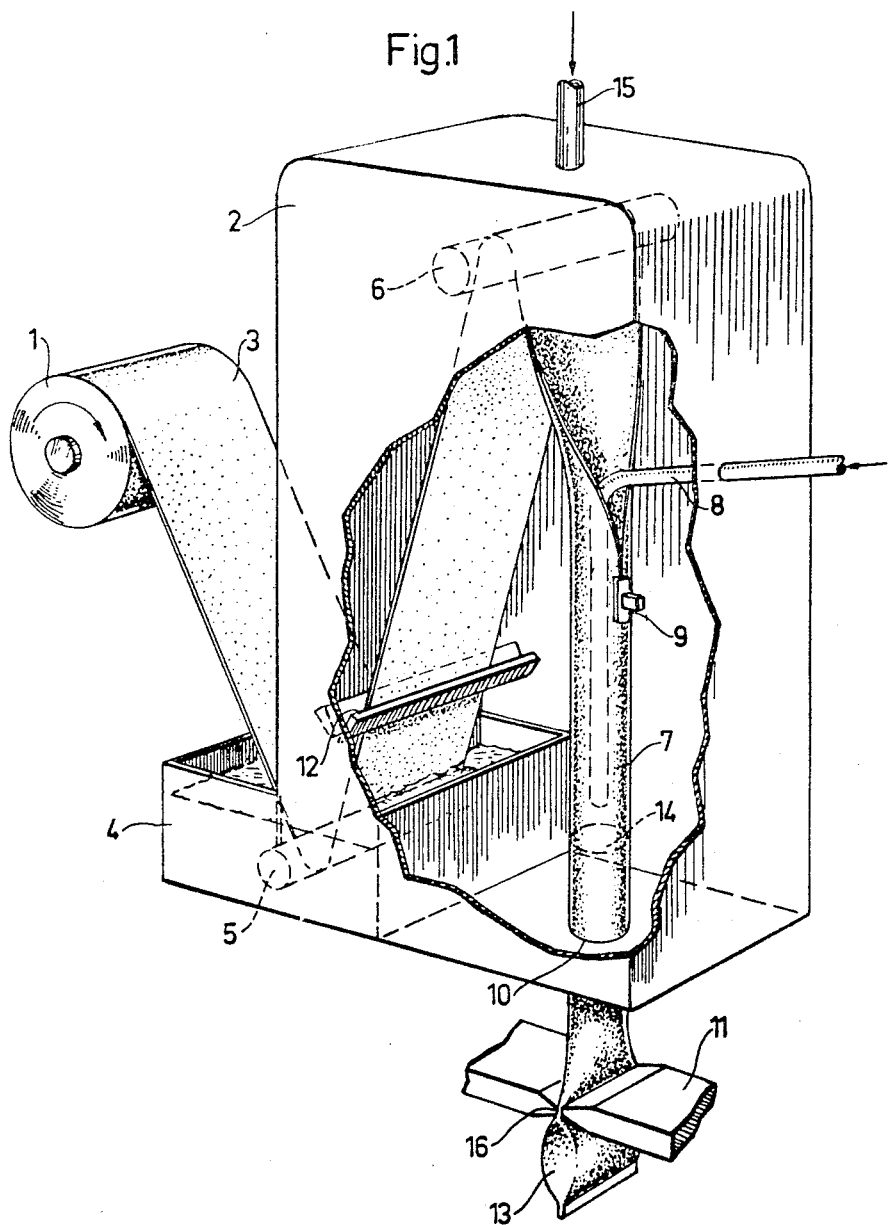

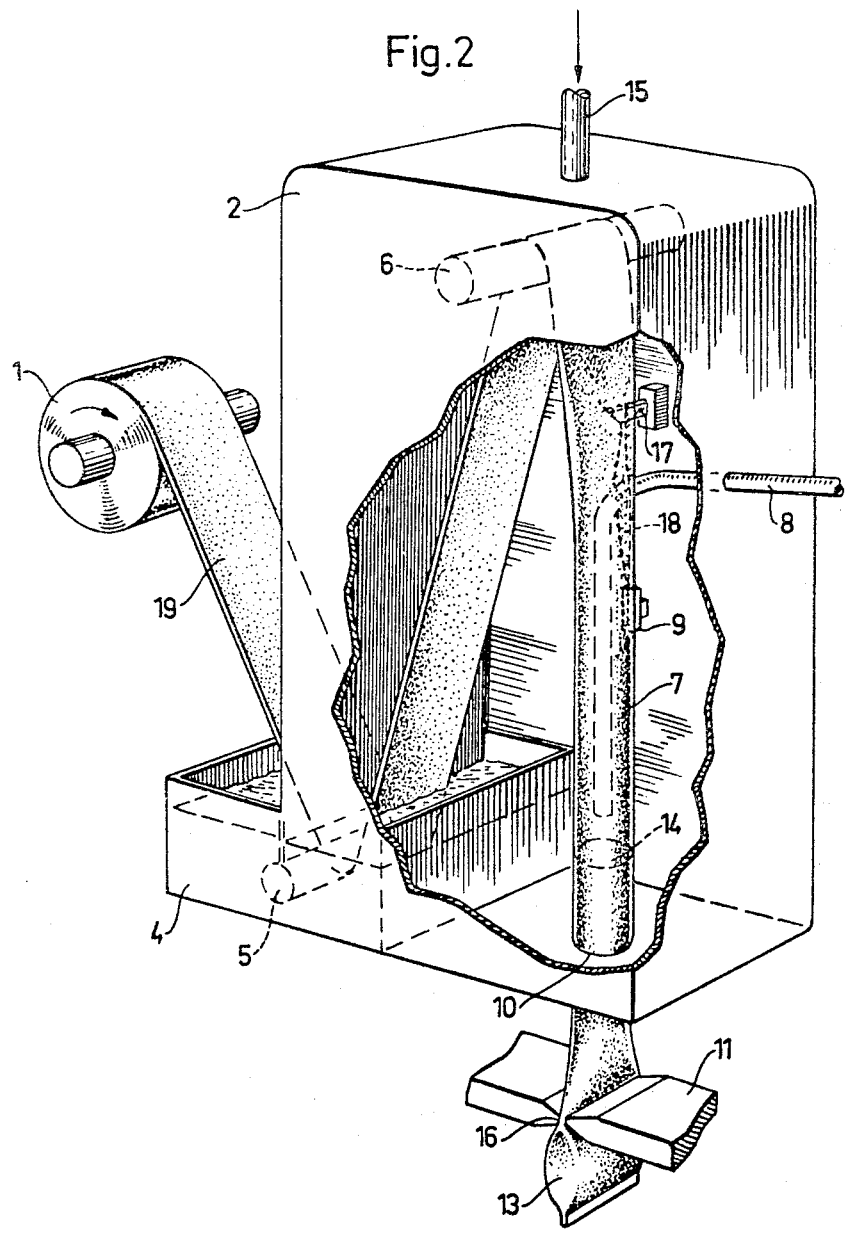

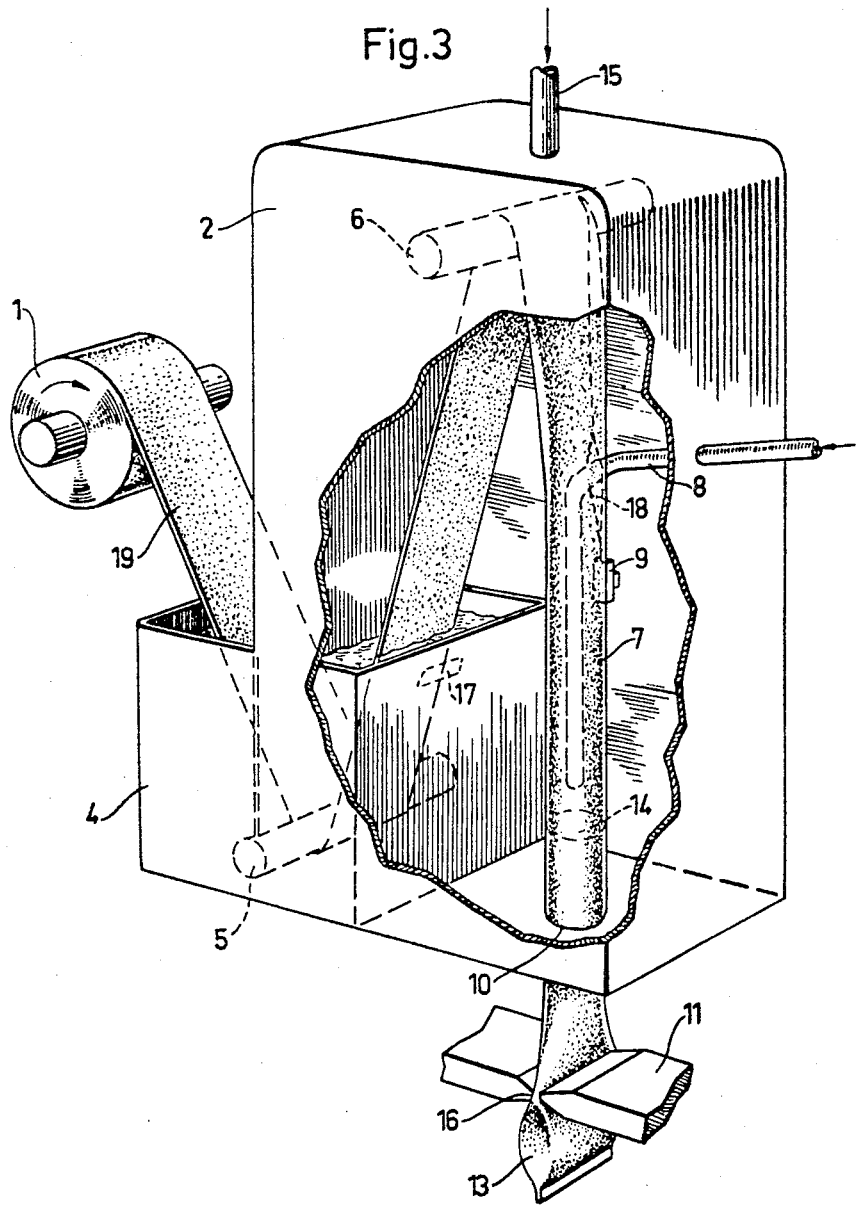

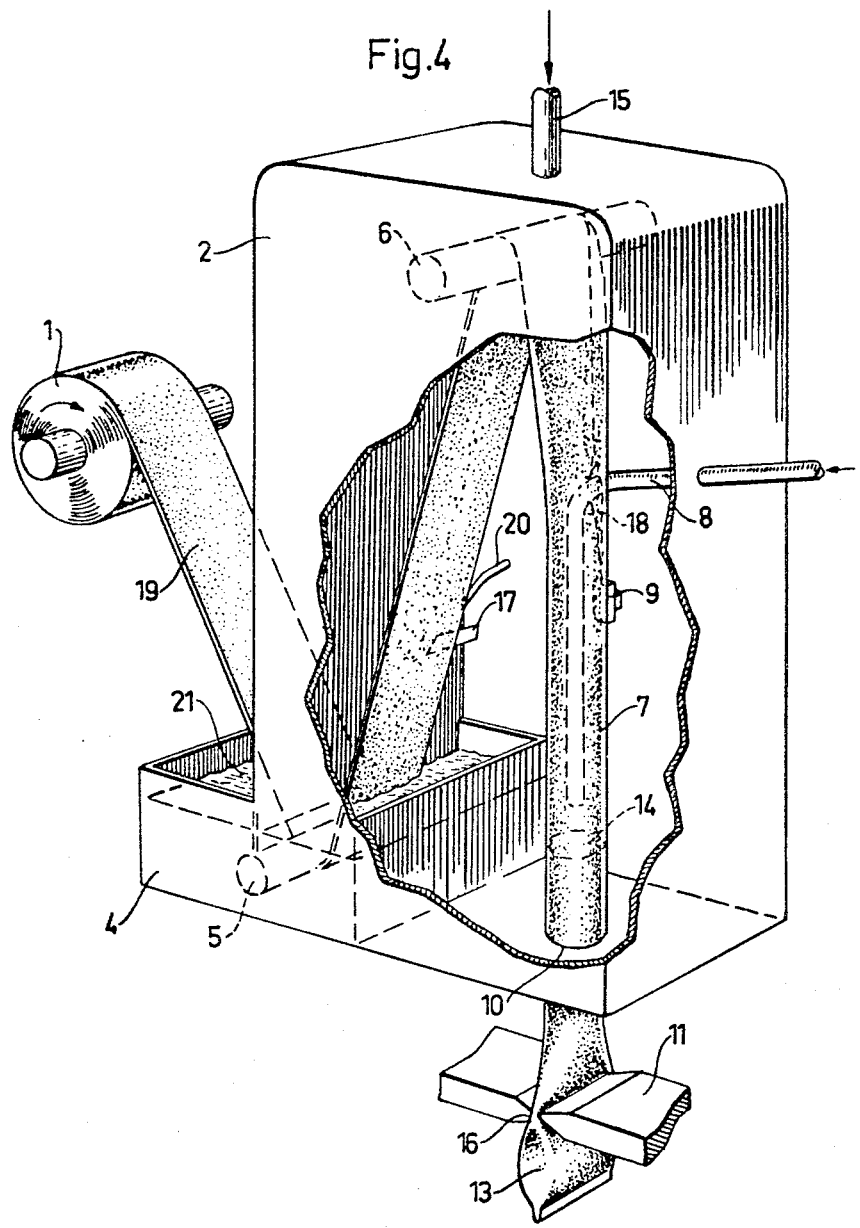

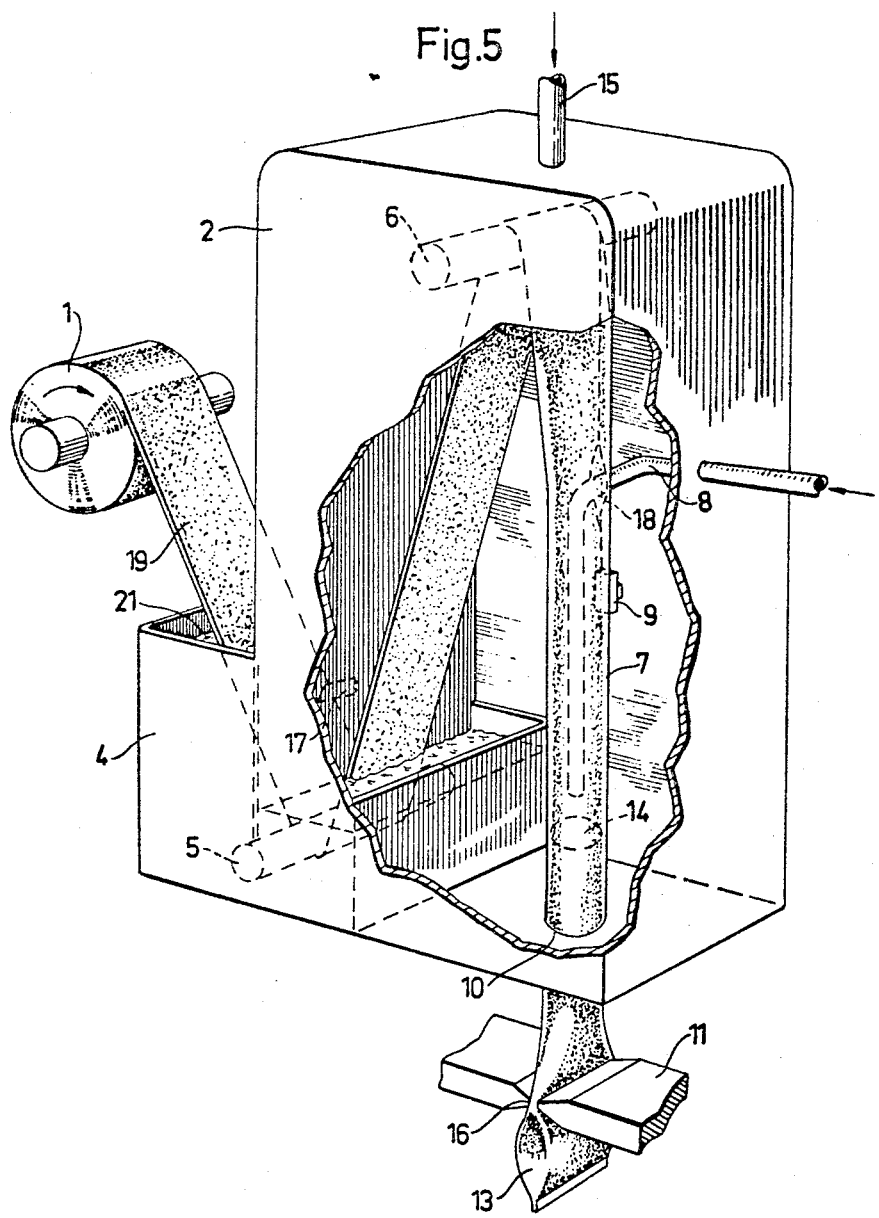

3,466,841
METHOD OF PACKAGING STERILE FILLING MATERIAL UNDER ASEPTIC CONDITIONS
Anders Ruben Rausing, Blentarp, Sweden, assignor to AB Tetra Pak, Lund, Sweden, a Swedish company
Filed Mar. 31, 1966, Ser. No. 539,040
Claims priority, application Sweden, Apr. 9, 1965, 4,615/65
Int. Cl. B65b 9/12
U.S. Cl. 53—28                  1 Claim

ABSTRACT OF THE DISCLOSURE

Method and apparatus to sterilize and maintain sterilization of a web material while such material is being formed into a package, filled and separated from the web as a sterilized completed package.

---

The present invention refers to a method of packaging sterile filling material under sterile conditions, the sterile filling material being enclosed in sterile containers made from a tube earlier prepared from a web of packaging material, said material being heat sealing and impermeable toward both bacteria and the contemplated filling material.

In packaging a sterile product, for example sterilized milk, care must of course be taken that the packaging operation is carried out under aseptic conditions and that the sterile filling material is filled into sterile containers impermeable to bacteria.

This packaging problem has up to now been solved by drawing off the sterile filling material into bottles or jars of sheet metal, glass or similar material which has been pre-sterilized by heating. The actual filling and sealing of said bottles and jars must of course take place in a sterile room, for example a space which after a thorough sterilization is vented through sterile-filtered air.

In the modern packaging art one often starts from a web of packaging material of heat sealing plastic which is formed into a tube which is filled and sealed by repeated heat sealing operations in sealing zones transverse in relation to the tube axis. It is well known to pack sterile liquid filling material with such technique by introducing the filling material into a tube of plastic covered paper formed from a web, the plastic layer of said paper being subjected, in connection with and after the tube formation but before the plastic covered inner wall of the tube coming into contact with the filling material, to heat sterilization which proceeds such that the inner side of the tube is heated by means provided in the tube to so high a temperature that bacteria and microorganisms existing on the tube wall are destroyed.

When the web of packaging material consists of a relatively thin plastic film which is not laminated to any stiffer, heat resistant layer, for example a paper layer, it is difficult, however, to apply said well known method, since the thin plastic film cannot be formed into a tube which is fixed in position in relation to the heat supplying means. In order that the tube inner side shall be uniformly heated at the heat sterilization the tube must be arranged concentrically with the heat supplying means, since there is otherwise a risk that certain portions of the inner side of the tube do not become sufficiently heated, while other portions will be over-heated. The extreme case which arises if the inner side of the tube comes into direct contact with the surface of the heat supplying means, will without fail cause the tube to burn fast to the heat supplying means or to melt in the contact zone.

To avoid these drawbacks the method according to the invention which is based on a chemical sterilization instead of a heat sterilization may be applied.

The method according to the invention is characterized by the fact that the web of packaging material is passed through a bath containing a sterilizing liquid, whereupon it is introduced into a sterile chamber in which a sterile atmosphere is maintained, and that the web of packaging material thus sterilized is formed in said sterile chamber into a tube around a filling pipe inserted in the sterile chamber, through which pipe the sterile filling material is introduced into the tube formed, the edge portions of which are joined in a seal running in the longitudinal direction of the tube, whereupon the tube as filled with sterile filling material is sealed off in sealing zones transverse in relation to the tube axis and divided up into individual packaging units.

The invention will be described in the following with reference to the accompanying diagrammatic drawings, in which:

FIGURE 1 shows a packaging machine in which a web of packaging material is converted into a tube which is filled and divided up into cushion-shaped packages;

FIGURE 2 shows a packaging machine in which the web of packaging material which consists of a hose is converted into packages;

FIGURE 3 shows a packaging machine in which the web of packaging material consists of a hose which is slit open to form a doubled web by means of a member located in the sterilizing bath, FIGURE 4 shows a packaging machine of substantially the same construction as the preceding ones but where the hose is filled with sterilization liquid in connection with the slitting-open thereof; and FIGURE 5 shows a further modification of the packaging machine shown in the preceding figures.

In the following description the same reference numerals are used for simplicity for corresponding details in all the figures.

The automatic packaging machine shown in FIGURE 1 contains a sterile chamber 2 in which a flat web of packaging material 3 which is delivered from a supply roll 1 is introduced via a lock or liquid-trap 4 filled with sterilization liquid. The web 3 is passed via a turning roll 5 submerged in the sterilization bath to a turning roll 6 situated in the sterile chamber 2, whereupon the web 3 is formed by forming means not shown into a tube 7 around the filling pipe 8. The edges of the web 3 formed into a tube 7 are then sealed to each other in a continuous longitudinal joint by means of a sealing member 9. The tube 7 is passed out of the sterile chamber 2 through an aperture arranged in the bottom of the sterile chamber 2, the form and size of said aperture corresponding to the section of the tube 7. By the filling pipe 8 the sterile filling material 14 is introduced into the tube, the lower part of which is sealed off by means of particular sealing members 11 in a zone 16 transverse in relation to the axis of the tube 7 so as to form individual packaging units 13. In the sterile chamber 2 there is furthermore provided a member 12 by means of which sterile air is blown against the surface of the web 3, and an intake 15 through which sterile-filtered air is blown into the sterile chamber 2.

The packaging operation which is carried out according to the invention proceeds in such way that the web of packaging material rolled up on the supply roll 1 and consisting of a heat sealing plastic which is impermeable to bacteria, for example polyethylene film or polypropylene film, is introduced into a sterile chamber 2 via a lock 4 containing a sterilization liquid. The lock 4 is arranged so that the inlet to the sterile chamber 2 is wholly covered, and therefore when introducing the web 3 into the sterile chamber 2 it must pass through the sterilization bath, the two sides of the web 3 being sterilized. As sterilization liquid one may preferably use hydrogen peroxide or some other strongly sterilizing agent which can be removed relatively easily from the web 3, after this has passed through the lock 4. In the sterilization bath a turning roll 5 is submerged across which the web 3 is passed before it is led into the sterile chamber 2 moving upwards. The hydrogen peroxide remaining on the web 3 after the passage of the web 3 through the lock 4 may be removed by means of a sterile flow of air which is blown by means of a dryer 12 against the surface of the web 3 in a direction which is substantially opposite the direction of movement of the web 3. To increase the efficiency of the dryer 12 the sterile-filtering air blown against the web may be heated by heater elements located in the dryer.

The dried web 3 is then passed across an upper turning roll 6 and further on in a direction vertically downward, during which movement the web 3 is formed by means not shown into a tube 7 around the filling pipe 8. The two edges of the tube 7 which have been brought together are joined and sealed to each other by the sealing member 9 which by means of heat and pressure causes the edge portions to fuse together into a homogeneous joint which is tight against bacteria. Even if the sealing member 9 consists of intermittently operating pinch jaws, the tube formation may nevertheless take place continuously, if the sealing member is mounted movable in the direction of the tube axis. The pre-sterilized filling material 14 is introduced into the tube 7 through a filling pipe 8 which is inserted in the sterile chamber and has been pre-sterilized together with the sterile chamber 2. The tube 7 filled with filling material 14 is conveniently carried out of the sterile chamber 2 through an aperture 10 made in the wall of the sterile chamber 2 and having a shape and size corresponding to the cross section of the tube 7. Thus, one attempts to produce a seal between the edge of the aperture 10 and the outside of the tube 7. This seal may be made relatively efficient, but for preserving the aseptic conditions prevailing in the sterile chamber 2 this chamber 2 is maintained under an inner superpressure, whereby the air infected with bacteria around the sterile chamber cannot leak into the chamber. Inasmuch as a certain amount of sterile air will leak out from the sterile chamber 2 through the aperture 10, new sterile-filtered air is supplied through the pipe 15 which opens into the top of the sterile chamber 2.

The tube 7 filled with the sterile filling material 14 is divided up, after being carried out from the sterile chamber 2, into individual packaging units 13 by sealing off the tube 7 in sealing zones 16 transverse in relation to the tube axis by means of heated pinch jaws 11 operating together in a pair. This sealing to divide up the tube 7 can of course also be carried out within the sterile chamber 2, but since it is advantageous to limit the volume of the sterile chamber 2 and the members within the sterile chamber it will be convenient to carry out the sealing outside the sterile chamber 2.

The automatic packaging machine shown in FIGURE 2 is substantially constructed in the same way as the machine shown in FIGURE 1. The machine according to FIGURE 2, however, does not work with a flat single web, but with a flatted hose 19 which is rolled up on a supply roll 1, as the starting material.

The reason why the web has been replaced by a flatted hose is that a hose of the kind intended can be easily manufactured with a sterile inner side, the sterility of which is then retained when the hose is stored in a roll. The manufacture of a plastic hose of the kind here intended, for example a hose of polyethylene or polypropylene, proceeds in such a way that a mass of plastic in molten form is extruded through an annular nozzle, whereupon the walls of the hose formed are cooled. In order that the walls of the plastic hose may not stick together, before the plastic material has cooled, sterile air is blown into the interior of the hose. Since at the extrusion the plastic material is heated to such a high temperature that all bacteria and microorganisms are destroyed, the inner side of the extruded hose will be sterile, and the sterility is maintained by introducing a sterile flow of air through an inlet in the extrusion nozzle. After pressing the hose flat and rolling it up on the supply roll the sterility of the hose inner side is maintained, since the walls of the hose are compressed into tight engagement in the roll. If desired, it is of course also possible to close the two ends of the hose to secure the inner side sterility.

The flatted hose 19 rolled off from the supply roll 1 is passed in the way described above through a lock 4 containing sterilization liquid, whereby the outer side of the hose 19 is sterilized. When the hose 19 via the turning roll 5 has been passed into the sterile chamber 2, the outer side of the hose 19 may possibly be dried in the way earlier described. Since there is maintained a sterile atmosphere in the sterile chamber 2, the hose 19 maintains its outside sterility during the passage through the sterile chamber 2. When the flatted hose 19 has been passed across the upper turning roll 6 and is carried vertically upward, the hose 19 is slit open along one edge by means of a member 17, e.g. a knife edge or a heated edge. The slit hose 19 forms a doubled flat web which is widened by means not shown into approximately tube shape around a filling pipe 8 which has been inserted through the slit produced. The edges slit open by the member 17 are again moved together and sealed to each other by means of a sealing member 9 which in the example shown consists of a pair of cooperating heated pinch jaws. The re-sealed tube 7 is thereupon supplied with sterile filling material 14 through the filling pipe 8, whereupon the tube 7 is moved out of the sterile chamber 2 through an aperture 10 in the wall thereof. The filled tube 7 moved out of the sterile chamber 2 is then divided up into individual packages 13 by means of seals 16 which are produced by means of a pair of cooperating heated pinch jaws 11.

The automatic packaging machine shown in FIGURE 3 functions principally in the same way as the machine shown in FIGURE 2. The starting material for the packages is thus also in this case a hose 19 of heat sealing plastic made ready in advance. In the machine shown in FIGURE 2 it is assumed that the inner side of the plastic hose 19 is always sterile, as long as the hose 19 is stored in a roll. This also holds true in the very most cases, but it must be taken into consideration that in certain cases, for example in the case of very thin plastic foils, microleakage may arise, i.e. leakage which does not influence the technical tightness of the packaging material but does influence the bacteriological tightness thereof. Such microleakages are of course difficult to discover, but the existence thereof may cause the inner side of the hose 19 to be infected, so that the problem has to be observed.

In those cases where the sterilization liquid is vaporized to a certain extent within the sterile chamber 2 the gases will of course penetrate through the microleakages arisen, and the leakage passages as well as the interior of the hose 19 will be maintained sterile. If the sterilization liquid should consist of hydrogen peroxide free oxygen gas will be formed in the sterile chamber, and this oxygen gas has proved to have bactericide properties. Since gas is capable of penetrating through considerably smaller leakages than possibly existing bacteria, one may always be sure that the leakages are kept sterile.

If the microleakages are of greater extension, the sterilization liquid, particularly if it has admixed to it surface tension reducing agents, may penetrate, at least to a limited extent, through the wall of the hose 19 and thereby prevent infection of the inner side of the hose 19. For the purpose of securing a sterile hose inner side under all circumstances it is shown in FIGURE 3, how the flatted hose 19 is moved down into the sterilization bath 4 and how the hose 19 after being passed across the lower turning roll 5 and while it is still in the sterilization bath is slit open along one edge by means of a slitting device 17 submerged in the sterilization bath and preferably consisting of a knife edge. Inasmuch as the hose 19 is slit open in the sterilization bath, the sterilization liquid will penetrate into the interior of the hose 19 and sterilize the inner side thereof. The hose 19 thus slit and sterilized is then introduced into the sterile chamber 2, where it is formed in the way described above into a tube 7 around a filling pipe 8 and is re-sealed. The re-sealed tube 7 is thereupon divided up into packages 13 by means of the sealing member 11.

In FIGURE 4 a further variant of the packaging machine is shown which operates starting from a flatted hose 19. The hose 19 which is rolled off from the supply roll 1 is passed in the way earlier described through the lock 4 which contains a sterilization bath and which is called upon to constitute a bacteriologically tight lock for the sterile chamber 4 and to constitute a container for the sterilization bath through which the packaging material is passed. When the flatted hose 19 has been moved through the lock 4 and into the sterile chamber 2, the outer side of the hose is sterile. For the purpose of securing also a sterile inner side the hose 19 is slit open along one edge by means of the member 17 which has been arranged in such a way that the hose 19 is slit open during its upward movement between the lower turning roll 5 and the upper turning roll 6. Since the member 17 has been located above the surface of the sterilization bath, the sterilization agent does not penetrate into the hose situated under the slit spot, but the sterilization liquid 21 is supplied through a supply channel 20 provided for that particular purpose. The further conversion of the split hose 19 into packages 13 is then carried out in the same way as in the case of the machine according to FIG. 3.

FIGURE 5 is similar to the modifications of FIGURES 2–4 except the slitter 17 is located between the roll 1 and turning roll 5 whereby the sterilization liquid will enter the hose 19 at the point of slitting as the base passes through the lock 4 as in the modification of FIGURE 3.

The examples of realization described above are only intended to illustrate the invention and the basic idea thereof. The invention may of course be applied to packaging machines having an appearance and design deviating from those here shown, and the final product, the package, may likewise be given any desired appearance.

The method according to the invention has proved to be particularly advantageous in those cases where the packaging material consists of a thin plastic film which cannot be heat sterilized without great difficulties and the achieved combination of a simple process combined with great safety in operation and small risk of infection makes the method highly useful when applied to automatic packaging machines.

That which is claimed is:

1. A method of packaging sterile filling material under aseptic conditions from a heat sealable flattened hose material with a sterile interior comprising the steps of: passing a web of packaging material through a sterilization bath, slitting a portion of said flattened hose under the surface of said liquid sterilization bath, introducing said web of material from said bath into a sterile zone, forming said web of material into tube shape in said sterile zone, filling said tube through said slit portion in said sterile zone with sterile filling material, sealing together the longitudinal edges of said tubular formed packaging material in said sterile zone and transversely sealing off and dividing said filled tube into individual packaging units.

References Cited

UNITED STATES PATENTS

| 2,188,306 | 1/1940 | Murch | 53—94 X |
| 3,376,689 | 4/1968 | Simpson et al. | 53—94 X |
| 2,194,565 | 3/1940 | Moss. | |
| 2,918,770 | 12/1959 | Stocker | 53—180 |
| 2,967,119 | 1/1961 | Gutterman | 134—64 X |
| 3,335,540 | 8/1967 | Reil et al. | 53—28 |

FOREIGN PATENTS 715,702  9/1954  Great Britain.

THERON E. CONDON, Primary Examiner

N. ABRAMS, Assistant Examiner

U.S. Cl. X.R.

21—58, 91; 53—180